United States Patent Office

3,200,129
Patented Aug. 10, 1965

3,200,129
COPPER PHTHALOCYANINE DYESTUFFS
David Irwin Randall, New Vernon, and Wilhelm Schmidt-Nickels, Little York, N.J., assignors to General Aniline & Film Corporation, New York, N.Y., a corporation of Delaware
No Drawing. Filed Dec. 7, 1962, Ser. No. 242,897
5 Claims. (Cl. 260—314.5)

This invention relates to novel dyestuffs and more particularly to a novel group of water soluble fiber-reactive dyestuffs of the phthalocyanine series.

A number of dyeing processes are known in which dyeings of improved fastness properties are obtained by reaction between the dyestuff and the fiber. Among the large number of types of reactive dyes proposed for use in such processes, only a few are commercially useful. These are the cyanuric, the pyrimidine and the vinyl sulfone or sulfatoethylsulfone types. Because of the relative scarcity of such dyestuffs and/or their substantial unavailability to large sections of the dyeing trade and/or various disadvantages inherent in their production or use with respect to procedure, cost, and/or results obtained, there exists a definite need in the industry for new and improved types of reactive dyestuffs and/or methods of making the same.

Water soluble dyestuffs of the phthalocyanine series have been proposed which are prepared by sulfonation of a phthalocyanine substituted by up to 4 N-β-hydroxy lower alkyl-aminomethyl groups. Such a sulfonated phthalocyanine derivative undoubtedly has increased water solubility and possibly other desirable properties, but is not considered to be of the fiber-reactive type. The sulfonation reaction is usually carried out in an excess of the sulfonating agent whereby it is difficult to isolate the sulfonated product in high purity without the formation of large quantities of salt in the product. Further, a change of shade occurs when sulfonation takes place on a phthalocyanine molecule. Still further, phthalocyanine molecules are sensitive to oxidation deterioration and therefore tend to decompose upon treatment with powerful sulfonating agents, particularly high strength oleum, which are known to be oxidizing agents.

It is an object of this invention to provide a novel group of water soluble dyestuffs of the phthalocyanine series which will not be subject to one or more of the above disadvantages. Another object of this invention is the provision of a novel group of fiber-reactive dyestuffs of the phthalocyanine series. Other objects and advantages will appear as the description proceeds.

The attainment of the above objects is made possible by the present invention which comprises compounds of the formula $Pcy(-CH_2NR^1-CH_2CH_2-X)_n$ wherein Pcy represents a member of the group consisting of metal and metal-free phthalocyanine, $R^1$ is a member of the group consisting of H, lower alkyl, hydroxyethyl, and $-CH_2CH_2-X$, X is the anion of a strong acid having a dissociation constant greater than $2.0 \times 10^{-5}$, and $n$ has an average value of 1 to 4.

The above defined dyestuffs are esters instead of sulfonation products of the above defined N-β-hydroxy lower alkyl - aminomethyl - containing phthalocyanines. These fiber-reactive dyestuffs, instead of containing sulfonic acid substituents in the fundamental phthalocyanine molecule, thus contain at least one esterified hydroxyethylaminoethyl, preferably sulfatoethylaminomethyl group which has been found highly effective as a fiber-reactive group when the dyestuff is applied to the fiber in the presence of an acid binding agent. These dyestuffs are of improved stability to hydrolytic conditions and yield colored products having surprisingly good fastness properties, particularly fastness to washing, kier-boiling, chlorine, light, alkaline and acid perspiration, and/or other hydrolytic conditions.

The dyestuffs of this invention may be prepared by known esterification with a strong acid having a dissociation constant greater than $2.0 \times 10^{-5}$, or substances yielding same, of a phthalocyanine intermediate or reactant of the formula $Pcy(-CH_2-NR-CH_2CH_2OH)_n$ wherein Pcy and $n$ have the values given above and R represents H, lower alkyl or hydroxyethyl.

In the above formulae Pcy represents an unmetallized phthalocyanine molecule or a metal phthalocyanine molecule of known type. As example of metal phthalocyanine molecules there may be mentioned copper, cobalt, aluminum, nickel, iron, zinc, vanadium, tin, magnesium, chromium, and other metal phthalocyanines. Whether metallized or unmetallized, the phthalocyanine molecule may be nuclearly substituted by one or more lower alkyl such as methyl or ethyl, halogen such as chlorine or bromine, sulfonic, or phenyl groups. The parenthetical groups in the above formulae are ordinarily bonded to phenylene nuclei in the fundamental phthalocyanine molecule but may be bonded to a phenyl substituent of a phenyl-substituted phthalocyanine molecule.

R in the reactant or intermediate may be hydrogen, more preferably lower alkyl such as methyl, ethyl, and normal and isomeric propyl and butyl, and optimally hydroxyethyl. It will be understood that one or more of the carbon-bonded hydrogens in the parenthetical group shown in both formulae may be substituted by lower alkyl of 1 to 4 carbon atoms, the corresponding acetylenically unsaturated alkyls (alkynyl), the corresponding ethylenically unsaturated alkyls (alkenyl), benzyl, cycloalkyl such as cyclohexyl and cyclopentyl, phenyl, naphthyl, heterocyclic such as furyl, which inert substituents may be further substituted or chain-interrupted by other inert groups or hetero atoms.

$n$ in the above formulae has a value of at least 1 and usually 1 to 4. Values of up to 8, representing two parenthetical substituents in each of the 4 phenylene rings of the fundamental phthalocyanine nucleus are also operative although not particularly practical, necessary or economical. It will be noted that when $R^1$ is $$-CH_2CH_2-X$$

as obtained by esterification of the reactant wherein R is hydroxyethyl, the number of fiber-reactive groups in the dyestuff of this invention is effectively doubled. Whenever these dyestuffs contain two or more such groups, dyeings are obtainable with increased fastness properties due to cross-linking reaction with the fibers.

The phthalocyanine reactant precursors employed in making the dyestuffs of this invention are readily obtainable in known manner by chloromethylation of a metal or metal-free phthalocyanine, as by reaction with bis-chloromethyl ether or equivalent, to introduce $n$ chloromethyl groups, followed by the reaction of the chloromethylated phthalocyanine of the formula $$Pcy(-CH_2Cl)_n$$

preferably in the presence of an acid-binding agent, with $n$ moles of a primary or secondary amine compound of the formula $H-NR-CH_2CH_2OH$ wherein $n$ and R have the values given above.

In accordance with a preferred embodiment of the invention, X in the formula for the present dyestuffs represents sulfato ($-OSO_3H$) as prepared by reaction of the phthalocyanine precursors described in the preceding paragraph with a known sulfating agent of any desired type. Preferably, such a sulfating reaction is carried out at a temperature ranging from the freezing point of the medium up to about 110° C., and preferably from about 25 to 110° C., using at least a molecularly equivalent amount of a sulfating agent which is a complex compound of sulfur trioxide with a tertiary organic amine. Such complex compounds are well known and are disclosed for example in U.S. 2,403,226. They may be represented by the formula $R^2R^3R^4N \cdot SO_3$ wherein $R^2R^3R^4N$ is the molecule of the tertiary organic amine. $R^2$, $R^3$, and $R^4$ may be the same or different and may be aromatic or non-aromatic such as lower alkyl of 1 to 4 carbon atoms, the corresponding ethylenically and acetylenically unsaturated hydrocarbons, aralkyl such as benzyl, alicyclic such as cyclohexyl and cyclopentyl, and heterocyclic such as furyl, or may together, in whole or part, represent the atoms necessary to complete a heterocyclic ring with the N atom such as pyridine, morpholine, and piperidine. As examples of such tertiary organic amines, there may be mentioned pyridine, N,N-dimethyl- and -di-butyl-aniline, tri-methyl-, -isobutyl-, cyclohexyl-, and -allyl-amines, methylethylisopropylamine, dimethyl and dibutyl benzylamines, cyclohexyl dimethylamine, cyclopentyl dibutylamine, N,N-dimethyl- and dibutyl-formamides, N-methyl- and butyl-morpholines and piperidines, and the like. For most purposes, these amines should have a disassociation constant of at least $1 \times 10^{-7}$.

The complex compound of the tertiary organic amine with sulfur trioxide is likewise prepared in known manner, in general requiring the action of sulfur trioxide or an agent yielding sulfur trioxide on the tertiary organic amine. As representative of such an agent, use may be made of chlorosulfonic acid in a ratio of one mole of the chlorosulfonic acid to two moles of the tertiary organic amine, the hydrogen chloride liberated during the reaction forming a salt with the extra mole of tertiary organic amine. The sulfur trioxide or agent yielding same may be added to the tertiary organic amine or vice versa, and the reaction may be carried out in excess tertiary organic amine, in an inert organic solvent or diluent such as chlorobenzene or the like, or in an aqueous alkaline media.

In the sulfating reaction between the phthalocyanine reactant and the tetriary organic amine-sulfur trioxide complex, an amount of the complex at least molecularly equivalent to the said reactant is employed in order to provide the resulting dyestuff with at least one fiber-reactive sulfatoethylimino group. The amount of complex employed will however generally be sufficient to esterify, i.e. sulfate, all the hydroxyethyl radicals in the parenthetical groups in the phthalocyanine reactant, i.e. $n$ molecular equivalents of the tertiary organic amine-sulfur trioxide complex when R is not hydroxyethyl, and two $n$ equivalents when R is hydroxyethyl.

The sulfating reaction may be carried out in aqueous media, in an inert organic solvent or diluent such as chlorobenzene, lower aliphatic alcohols, acetone or the like, in aqueous media containing the same, or preferably in an excess of the organic tertiary amine, in which case the desired product is produced in the form of the amine salt. The corresponding alkali metal salt may be obtained, and the tertiary organic amine simultaneously liberated and recovered by treating such amine salt with alkali such as sodium or potassium hydroxide. The corresponding acid-sulfate ester may likewise be obtained in known manner by acidification, salting, etc. and it is to be considered equivalent to the salts thereof with amines, alkali metals, etc.

The above described method of reacting a tertiary organic amine-sulfur trioxide complex with the defined phthalocyanine reactants or precursors for producing the dyestuffs of the present invention is per se not claimed herein, being disclosed and claimed in the co-pending application Serial No. 242,898, filed on even date herewith by Charles W. C. Stein, now abandoned.

Alternatively, X may represent the anion of any other strong acid having a disassociation constant greater than $2.0 \times 10^{-5}$ such as the anions of hydrochloric, hydrobromic, hydrofluoric, iodic, phosphoric, phosphonic, phosphinic, organic sulfonic (sulfonyloxy), trichloroacetic, dichloroacetic, chloroacetic formic acid and the like. These dyestuffs may likewise be readily produced in known manner by reaction of the phthalocyanine precursor with the corresponding esterifying acid or a functional equivalent thereof under known esterifying conditions. When X is sulfate, the dyestuffs of the invention are essentially water soluble. In some instances, when X is other than sulfato, increased water solubility may be obtained by employing a sulfonated phthalocyanine precursor or by sulfonating the final, previously esterified dyestuff.

The fiber-reactive phthalocyanine dyestuffs of the present invention are highly effective for coloring natural and synthetic fibers, particularly cellulosic textile fibers in any desired shades of good to excellent fastness and stability properties. The coloring process involves dyeing (including printing) the fibrous materials by application thereto under acid-binding conditions of an aqueous medium containing a dyestuff of the invention at any temperature ranging from ambient temperatures to the boiling point of the medium. The medium may have a pH range from about 4 to 14 although alkaline conditions are preferred. The medium may be applied in any desired manner, by continuous or batch methods and by immersion, roller application, padding, spraying, brushing, printing or the like. The speed of reaction between the fiber and the fiber-reactive dyestuff produced by the present process will generally vary inversely with the temperature. The fiber, for example in the form of a fabric, may for example be continuously padded with the fiber-treating medium, and then, if desired after a gentle squeezing, may be wound on a roller with alternating sheets of polyethylene film, and/or the entire roll wrapped in a polyethylene package, and the package held at room temperature or slightly higher until completion of the desired reaction between the fiber and the reactive dyestuff has taken place. This may require several hours or more. Alternatively, the fiber may be allowed to remain in the fiber-treating medium at room or elevated temperatures up to the boiling point of the medium until the coloring process is completed which may range from 20 minutes or less to several hours or more. Preferably, the fiber is continuously padded with the fiber-treating medium, squeezed to, for example, a 50 to 200% liquor pickup, dried and heated at 90 to 350° C. for an hour or more to 30 seconds or less. A day heat treatment may be substituted by a steaming or the like if desired.

The dyeing medium may contain adjuvants commonly used in dyeing processes as for example solution aids such as urea and thiodiglycol, migration inhibitors such as cellulose ethers, sodium chloride, sodium sulfate and other salts, wetting agents preferably of the nonionic surface active type as produced for example by polyoxyethylenation of such reactive hydrogen containing compounds as higher molecular weight alcohols, phenols, fatty acids, and the like, and thickening agents for the production of printing pastes such as methyl cellulose, starch, gum arabic, gum tragacanth, locust bean gum, sodium alginate, synthetic resins, and the like.

The following examples are only illustrative of this invention and are not to be regarded as limitative. All parts and proportions referred to herein and in the appended claims are by weight unless otherwise indicated.

Example 1

Forty-five parts of chlorosulfonic acid are added slowly to 200 parts of pyridine. After all the acid is added, 40 parts of tris-(N,N-di-(hydroxyethyl)-amino-methyl) copper phthalocyanine are added to the solution of the pyridine-sulfur trioxide complex, allowing the temperature to rise to 40° C. The temperature is held at 40° C. for one hour, then the reaction mixture is cooled and poured into 600 parts of cold water. The solution is adjusted to a pH of 6.0 with 50% sodium hydroxide solution and the pyridine and water mixture distilled off under vacuum at temperatures below 60° C. After all the pyridine is removed the aqueous solution is evaporated on the steam bath and dried under vacuum. A blue powder is obtained which is readily soluble in water with a deep blue color. It has the formula:

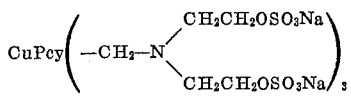

Example 2

Thirty-one parts of sulfur trioxide are added slowly to 200 parts of pyridine. After all the sulfur trioxide is added, 40 parts of tris-(N,N-di-(hydroxyethyl)-aminomethyl)chloro copper phthalocyanine containing 3.5% chlorine are added to the pyridine-sulfur trioxide complex. The solution is then heated to 60° C. and held for one hour at that temperature. The mixture is cooled, poured into 600 parts of cold water and worked up as in Example 1. A blue powder is obtained with a greener shade than the product of Example 1.

Example 3

Thirty-one parts of sulfur trioxide are added slowly to 480 parts of dimethyl aniline. After all the sulfur trioxide is added, 40 parts of bis-(N-methyl-N-hydroxyethyl-aminomethyl) cobalt phthalocyanine are added to the solution. The reaction mixture is heated to 100° C. for two hours. It is then cooled and poured into 400 parts of cold water. The solution is adjusted to a pH of 6.0 with 50% sodium hydroxide solution and the dimethyl aniline removed under vacuum steam distillation. After all the solvent is removed, the product is isolated by evaporation of the aqueous solution on a steam bath. A blue powder is obtained which gives a deep blue solution when dissolved in water. It has the formula

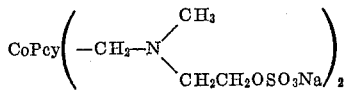

Example 4

Ten parts of the copper phthalocyanine precursor employed in Example 1 are added slowly to 60 parts of syrupy phosphoric acid (phospholeum, 105% H₃PO₄) and the solution heated at 100° C. for two hours. The reaction mixture is then poured into 600 parts of ice water, filtered, re-slurried in water, the slurry adjusted to a pH of 5-6 with 50% sodium hydroxide solution, and the desired product salted out with sodium chloride, filtered and washed with salt solution. The dried product is a blue powder readily soluble in water having the formula

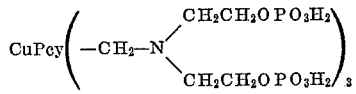

Example 5

Forty parts of copper phthalocyanine containing an average of 3.4 N,N-di-(hydroxyethyl)-aminomethyl groups per molecule are added gradually to a solution of 80 parts of benzene sulfonyl dichloride in 200 parts of pyridine, allowing the temperature to rise to 40° C. The temperature is held at 40° C. for about an hour, then the reaction mixture is cooled and poured into 600 parts of cold water. The solution is adjusted to a pH of about 6.0 with 50% potassium hydroxide solution and the pyridine and water mixture distilled off on the vacuum at temperatures below 60° C. After all the pyridine is removed, the aqueous solution is evaporated on a steam bath and dried on the vacuum. The product is a blue powder having the formula

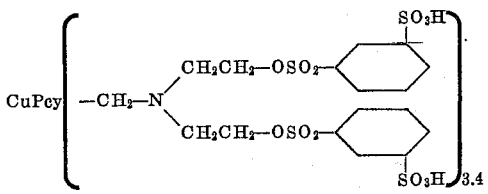

Example 6

A cotton fabric is printed with a paste consisting of 20 parts of one of the dyestuffs produced in the above examples, 100 parts of urea, 350 parts of water, 500 parts of sodium alginate thickener and 20 parts of sodium bicarbonate, dried and steamed for 10 minutes at 103° C. The fabric is then soaped well and rinsed. Brilliant turquoise blue prints are obtained with good wet fastness, crocking and lightfastness.

This application is a continuation-in-part of our application Serial No. 160,641, filed December 19, 1961.

This invention has been disclosed with respect to certain preferred embodiments and various modifications and variations thereof will become obvious to the person skilled in the art. It is to be understood that such modifications and variations are to be included within the spirit and scope of this invention.

We claim:

1. A compound of the formula

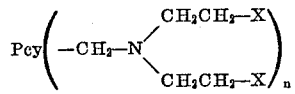

wherein Pcy represents copper phthalocyanine, X is selected from the group consisting of phosphato and (m-sulfo-)benzenesulfonyloxy, and $n$ has an average value of 1 to 4.

2. A compound as defined in claim 1 wherein X is phosphato.

3. A compound as defined in claim 1 wherein X is (m-sulfo-)benzenesulfonyloxy.

4. A compound of the formula

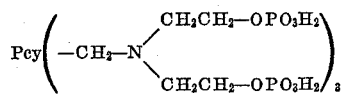

wherein Pcy represents copper phthalocyanine.

5. A mixture of compounds of the average formula

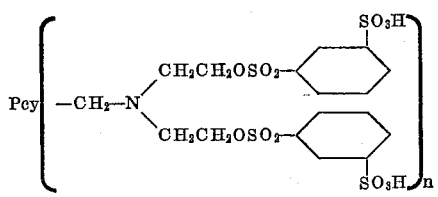

wherein Pcy represents copper phthalocyanine and $n$ has an average value of 3.4.

References Cited by the Examiner

UNITED STATES PATENTS

| | | | |
|---|---|---|---|
| 2,475,228 | 7/49 | Felix et al. | 260—314.5 |
| 2,670,265 | 2/54 | Heyna et al. | 260—314.5 |
| 2,863,875 | 12/58 | Bienert et al. | 260—314.5 |
| 2,995,412 | 8/61 | Kleb | 260—314.5 |
| 3,023,218 | 2/62 | Tartter | 260—314.5 |
| 3,042,683 | 7/62 | Howard et al. | 260—314.5 |
| 3,062,830 | 11/62 | Buc et al. | 260—314.5 |
| 3,066,005 | 11/62 | Wedemeyer et al. | 260—314.5 |

OTHER REFERENCES

Wegmann: Textil-Praxis (October 1958), pages 1056–1061.

IRVING MARCUS, *Primary Examiner.*

NICHOLAS S. RIZZO, WALTER A. MODANCE,
*Examiners.*